United States Patent [19]

Spreitzer

[11] 3,948,457
[45] Apr. 6, 1976

[54] MICROFILM TAKEUP REEL AND CONVERTER KIT

[76] Inventor: Francis F. Spreitzer, 4415 W. 62nd St., Los Angeles, Calif. 90043

[22] Filed: Feb. 10, 1975

[21] Appl. No.: 548,205

[52] U.S. Cl. .................. 242/74; 242/71.8; 403/362
[51] Int. Cl.² ......................................... B65H 75/28
[58] Field of Search ...... 242/71.8, 71.8 A, 74, 68.3; 403/362

[56] References Cited
UNITED STATES PATENTS

| | | | |
|---|---|---|---|
| 3,354,776 | 11/1967 | Smitzer | 242/74 |
| 3,715,088 | 2/1973 | Rissberger | 242/74 |

FOREIGN PATENTS OR APPLICATIONS

| | | | |
|---|---|---|---|
| 239,052 | 5/1965 | Austria | 242/74 |
| 588,763 | 12/1959 | Canada | 242/74 |

*Primary Examiner*—Edward J. McCarthy
*Attorney, Agent, or Firm*—Sellers and Brace

[57] ABSTRACT

An improved microfilm takeup reel designed for foolproof use on widely differing film reader constructions. The reel includes provision safeguarding against vexatious misuse practices commonplace in libraries and the like. The improved takeup reel remains fixed to a takeup arbor of a reader thereby making it mandatory to rewind the reel onto its original supply reel and preventing return of the film to storage while wound backwardly. The improved film handling facility also includes simple means for quickly attaching a film leader to the takeup reel without interfering with the use of the film with a conventional takeup reel.

26 Claims, 4 Drawing Figures

U.S. Patent  April 6, 1976  3,948,457
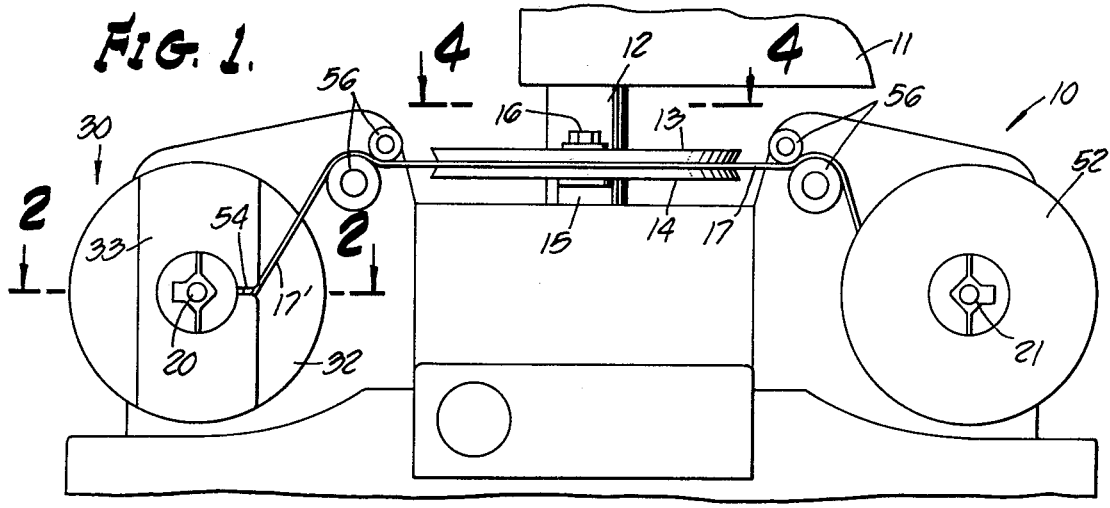
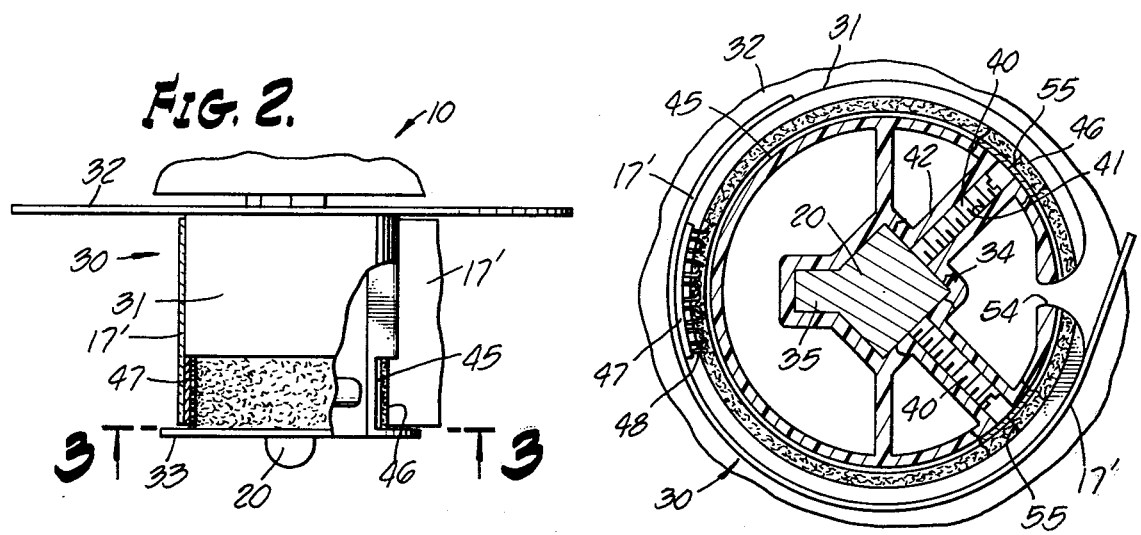
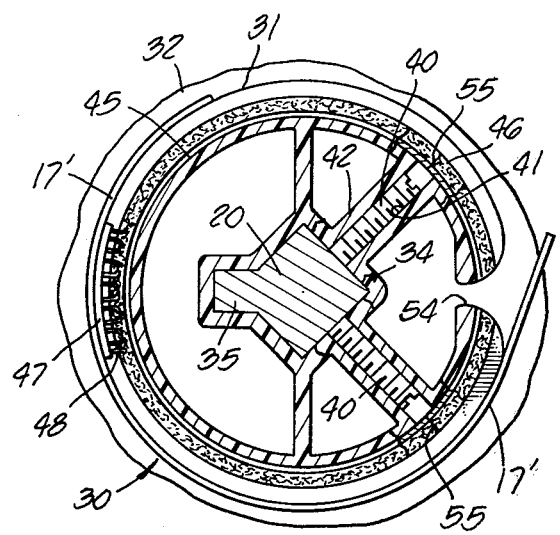
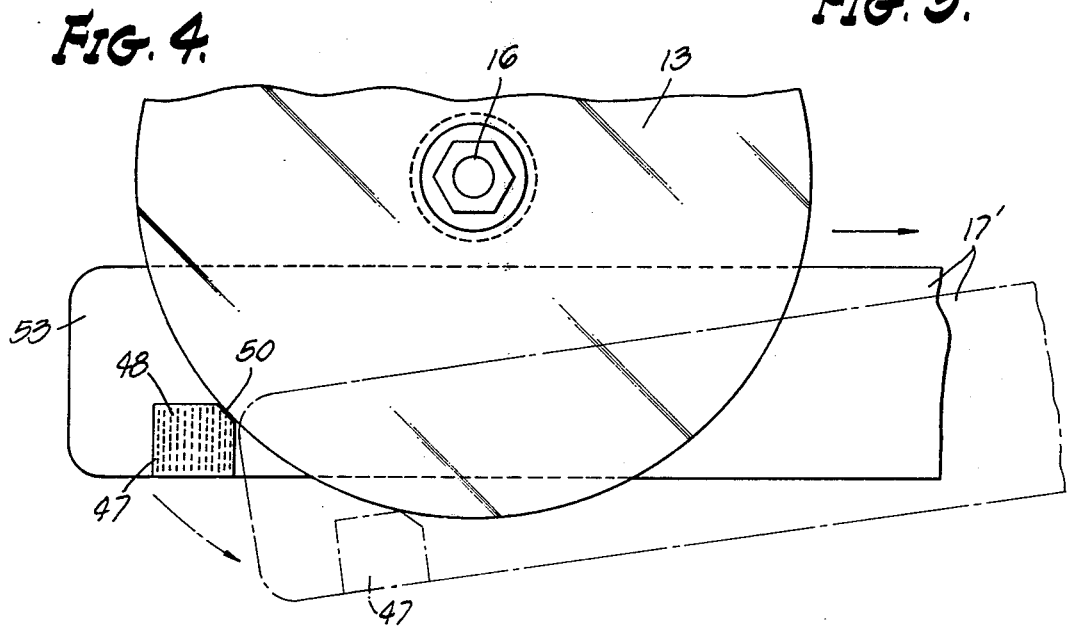

MICROFILM TAKEUP REEL AND CONVERTER KIT

This invention relates to microfilm reader equipment and more particularly to a universally-compatible easy film loading accessory safeguarding against certain abuses now commonplace using constructions heretofore proposed.

A variety of proposals have been made to facilitate attaching a film leader to the takeup spool and involving some expedient associated with the reel hub for retaining the leader captive while being coiled onto the reel. These expedients include a receiving slot axially of the hub, magnetic means operating in connection with a cooperating magnetically sensitive element on the leader, perforations lengthwise of the leader cooperating with tangs on the reel, resilient gripper means frictionally gripping the edge of the leader, different modes of utilizing pressure-sensitive adhesive layers applied to the reel hub and the film leader, separable interlocking seam means, etc. Each of these prior proposals is subject to certain shortcomings and disadvantages avoided by the present invention.

A particularly serious problem associated with the use of microfilm occurs when a user fails to rewind the film onto its original supply reel but instead coils the film onto the takeup reel which is then removed from the reader and returned to storage. In consequence, the film is stored in inverted condition and cannot be again used until it has been transferred back to another supply spool, an operation usually requiring the costly and time-consuming efforts of service personnel.

The foregoing and other shortcomings of prior microfilm handling facilities are avoided by the present invention employing an improved takeup reel which is not only exceedingly simple and fool-proof but highly versatile and readily installed on a wide range of existing reader equipment without need for adapters or changes in the equipment. The specially constructed rugged takeup reel is designed to be fixedly installed on the takeup arbor of any conventional microfilm reader. Typically, the fastening means for installing the reel on the arbor may comprise one or more set screws mounted in the hub beneath the film leader with the result that any film wound on the hub conceals the fastening means and renders it inaccessible. It follws that the film can only be removed from the reader by rewinding it upon its own supply reel.

Another important feature of the invention is the provision of highly effective attaching means applied in part to the takeup reel and in part to the film leader and by which the leader can be quickly and positively secured to the reel. For this purpose the reel hub is recessed to seat one of the two attaching components, the second and cooperating component being bonded to the surface of the film leader in an area spaced rearwardly from its free end so as not to interfere with the insertion of the leader end in the leader anchor slot of a conventional takeup reel, if the user so prefers. Desirably, the leader attaching or anchoring components are located adjacent one lateral end of the takeup reel and of the film leader. The outboard flange of the invention takeup reel is also notched or cut away on one side of the hub to provide for unobstructed access to the hub area while attaching the film leader thereto. The bottom of this notch also preferably includes a slot opening into a leader receiving slot extending axially of the reel hub thereby giving the user the option of attaching the leader to the takeup reel in this mode rather than by using the cooperating interengaging attaching components mentioned above.

Some film readers transport the film past the image projecting station while held flat between a pair of cooperating transparent discs commonly called "flats". By mounting one of the two attaching components on the film leader adjacent the outboard edge of the leader, the rearwardly facing inner corner of the component engages the rim of one of the transparent flats during rewinding of the film and automatically cams the leader past the flats without risk of injury to the leader.

Accordingly it is a primary object of this invention to provide an improved takeup reel for a film reader fixedly securable to a microfilm reader takeup arbor.

Another object of the invention is the provision of a film takeup reel having means for securing the reel to a takeup arbor which means is concealed and inaccessible so long as a length of film leader is wound about the reel hub.

Another object of the invention is the provision of an improved film takeup reel having a portion of its outboard flange cut away to facilitate attachment of a film leader to the reel hub.

Another object of the invention is the provision of a film takeup reel having film leader attaching means mounted on its hub and readily engageable with a cooperating attaching component mounted on the surface of a film leader thereby to anchor the leader to the takeup reel but automatically releasing the leader during film rewinding.

Another object of the invention is the provision of a film handling facility for a film reader having improved means for attaching the leader to a takeup reel and readily installable on existing film reader equipment without need for structural changes or the use of adapters.

Another object of the invention is the provision of a converter kit readily installable on various types of conventional film reader equipment and including provision for safeguarding against removal of film from the equipment unless properly recoiled on its own supply reel.

Another object of the invention is the provision of an improved film handling system for microfilm readers readily usable with both 35mm and 16mm microfilm.

These and other more specific objects will appear upon reading the following specification and claims and upon considering in connection therewith the attached drawing to which they relate.

Referring now to the drawing in which a preferred embodiment of the invention is illustrated:

FIG. 1 is a fragmentary front elevational view of a typical microfilm reader equipped with the invention film handling improvements;

FIG. 2 is a cross-sectional view on an enlarged scale taken along line 2—2 on FIG. 1;

FIG. 3 is a cross-sectional view on an enlarged scale taken along line 3—3 on FIG. 2; and FIG. 4 is a fragmentary view taken along line 4—4 on FIG. 1 and indicating in dot and dash line the manner in which the film leader is cammed laterally from between the circular transparent flats while being rewound on the film supply reel.

Referring initially more particularly to FIG. 1, there is shown that portion of a typical microfilm reader, designated generally 10, in proximity to the film transport and the image projection station. The reader there shown by way of example will be understood as manufactured by Eastman Kodak, Model MPE. This machine has a projection lamp housing 11 pivotally supported on a vertical axis by a bracket 12 fixed to the main frame of the machine. Located in the path of the light beam projection axis are a pair of transparent discs or flats 13, 14 having their centers secured to boss 15 by an assembly bolt 16. It will be understood that flats 13, 14 have their adjacent surfaces spaced apart sufficiently to permit the film strip 17 to pass freely therebetween while supported in a horizontal focal plane normal to the axis of the projection light beam.

The microfilm handling and transport facility of reader 10 includes a takeup reel arbor 20 and a supply reel arbon 21 supported parallel to one another on the opposite sides of the film image projection station. The two arbors 20, 21 are rotatable in either direction and, as here shown, each is selectively motor driven in a clockwise direction. However, it will be understood that it is immaterial to the operation of this invention whether the reels are driving in the same or opposite directions. The inboard end of each arbor is rotatably supported by the main frame of the reader and their outboard ends are unobstructed and free to receive the mounting bore of a film reel telescoped thereover.

An illustrative embodiment of the invention take-up reel, designated generally 30, will now be described with particular reference to FIGS. 1, 2 and 3. This reel may be molded from any suitable material such as high strength thermoplastic material, and has a tubular hub 31 secured to a circular film-retaining flange 32 on its inboard end. The outboard film retaining flange as herein shown comprises a strip 33 the outer ends of which have the same radius as the inboard flange 32. As shown, the diametrically opposed sectors of flange 33 are cut away nearly to the surface of hub 31 to provide the user with greater freedom of access to the hub while attaching the film leader thereto. However, it will be understood that only one side may be notched or cut away.

As is best shown in FIG. 3, hub 31 has molded integral therewith a hollow hub structure 34 having a close sliding fit with takeup arbor 20. Usually, such arbors are non-circular in cross-section and may include a rib 35 seatable in a complementally shaped portion of reel hub 34.

Suitable means for securing takeup reel 30 to arbor 20, as here shown by way of illustration, comprises one or more set screws 40 mounted in threaded bores 41 of radial bosses 42 interconnecting the inner and outer hubs 31, 34. The outer ends of these set screws may be formed with a conventional kerf or with a socket seating an Allen head wrench.

The means for quickly and releasably attaching or anchoring a film leader to the hub of the takeup reel comprises a recess 45 formed in the outer surface of hub 31 and extending partially or completely around the hub. This recess is preferably located adjacent either the inboard or the outboard flange 32, 33 and is preferably confined to one lateral half of the film leader. Mounted in recess 45 is one of two interengageable components 46, 47 constructed in well known manner and effective to interlock with one another upon light contact of their facing surfaces. Recess 45 preferably has a depth corresponding to the combined thicknesses of these two components, component 46 being shown in FIGS. 2 and 3 and component 47 being shown in FIG. 4.

Components 46, 47 as herein shown are a well known type readily available on the market under the trademark name VELCRO. Component 46 comprises a maze of randomly arranged spaced apart filaments bonded together at points of crossover, and providing interstices readily penetratable by the hooked outer ends of a multiplicity of flexible plastic barbs 48 projecting from the surface of component 47. The latter is shown bonded to the outboard lateral edge of film leader 17' in an area rearwardly of the end of the leader. Any suitable bonding agent may be employed. The inner rearwardly facing corner of component 47 may be cut away as indicated in FIG. 4 to provide a camming surface 50 facing toward the rim edge of the adjacent one of the transparent flats 13, 14. As will be evident from FIG. 4, camming surface 50 engages the rim of one of the circular flats 13, 14 during rewinding of the film on supply reel 52 and acts to cast the film strip outwardly from between the flats without damage to component 47 or the flats.

Despite the ease and convenience of using the attaching components 46, 47 described above, some users are accustomed to inserting the leading end 53 of the leader, sometimes called a loop tab into the customary anchor slot extending axially of the hub. Accordingly, reel 30 is provided with an anchor slot 54 (FIG. 3) extending through one lateral edge of the inboard flange 32 and along the length of hub 31 to the outboard flange 33. (FIG. 1). The outer lateral edges of this slot are rounded to provide piloting surfaces facilitating the insertion of loop tab 53 into the slot. This insertion may be radially or axially of slot 54.

In order to discourage unauthorized tampering with the set screw 40 holding takeup reel 30 fixedly assembled to arbor 20 the bores supporting these set screws preferably open through the bottom of the recess 45. In this event the set screws are normally covered by the leader attaching component 46. A portion of component 46 overlying the set screws may be slit or formed with a small tool-receiving opening indicated at 55 in FIG. 3. Authorized service personnel familiar with the location and purpose of this slit or opening can readily insert the end of the tool therethrough in order to tighten or loosen the set screws whenever there is need to do so. All other persons would have no knowledge of how the takeup reel is secured to the arbor.

The mode of use of accessory embodying the present invention will be readily understood from the foregoing detailed description. It will be understood that any microfilm and any of many standard microfilm readers can be readily converted to utilize the features of this invention. The converter components comprise the described takeup reel 30 and the film attaching components 46, 47. The rear face of component 47 is separate item coated with pressure sensitive adhesive and protected by a readily removable mask before mounting the component on the proper face of a leader rearwardly of the advance end thereof. The film leader is threaded between the usual guide rollers 56, 56 and between the flats or other gating mechanism. The attaching component 47 on the advance end of the leader is then guided between the flange of takeup reel 30 with the barbs 48 contacting and penetrating into the interstices between the filaments of components 46 to hold the film firmly anchored to the takeup reel. Alternatively, the user may be able to insert the loop tab 53 of the leader edgewise or endwise through the receiving slot 54. The operator then proceeds to use the reader in the usual manner manipulating the customary controls to position selected film images in alignment with the projection axis of the reader.

After the operator is through using a particular film he will find it impossible to remove the film from the reader except by rewinding it upon supply reel 52. Accordingly, it is impossible for the user to return the film to storage except in the prescribed manner with the leader wrapped about the exterior of the film and in readiness for reuse at a future date. Only a single takeup reel is required and this reel is permanently mounted on the takeup arbor of each microfilm reader. By obtaining an adequate supply of the reader attaching components 47 and bonding one to the leader and each supply reel of film, it is a simple matter to convert a very large inventory of microfilm for use in accordance with this invention.

While the particular improved microfilm takeup reel and converter kit herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A microfilm takeup reel adapted to be telescoped over the exposed outer end of a film reader takeup arbor and fixed thereto to thwart removal of said reel from the reader until the film has been restored to a storage reel, said takeup reel having a hub provided with radial flange means on at least one end thereof, means carried by said reel to hold a film leader releasably captive while being wound around the hub of said reel, and means for holding said takeup reel captively assembled to the takeup arbor of a film reader to thwart attempts of the user to remove the same from a film reader with film stored thereon.

2. A film takeup reel as defined in claim 1 characterized in that said means for retaining said takeup reel assembled to an arbor is carried by said hub.

3. A film takeup reel as defined in claim 1 characterized in that said means for retaining said takeup reel assembled to an arbor is inoperable to release said takeup reel while in use with film wound about the hub thereof.

4. A film takeup reel as defined in claim 1 characterized in the provision of means normally concealing said retaining means from view.

5. A takeup reel as defined in claim 4 characterized in that said means concealing said reel retaining means is secured to said hub.

6. A takeup reel as defined in claim 5 characterized in that said means concealing said reel takeup means embraces a portion of said hub and includes means cooperable with means on the leading end portion of a length of microfilm to hold said leading end portion captive while being wound onto said takeup reel.

7. A takeup reel as defined in claim 4 characterized in that said hub is formed with a shallow recess overlying the outer end of said reel retaining means near one axial end of said hub.

8. A takeup reel as defined in claim 1 characterized in that said takeup reel includes means cooperable with the leading end portion of a length of microfilm to retain said leading end portion captive while said reel is in use to store film from a supply reel mounted on a film reader.

9. A takeup reel as defined in claim 8 characterized in that said flange means on one end of said reel is non-circular and shaped to provide unobstructed access to the outboard portion of said hub, and said hub having a radial film threading slot extending axially thereof and opening through said outboard end of said hub to facilitate threading of the end of a film leader thereinto.

10. A takeup reel as defined in claim 8 characterized in that said flange means on the outboard end of said reel comprises a rigid strip having the midportion thereof secured to the adjacent end of said hub, and said hub and said strip having a narrow slot lying in a common plane radially of said hub and sized to loosely receive the end of a film leader inserted edgewise from said one end of said hub.

11. A takeup reel as defined in claim 8 characterized in that said one end of said hub is provided with a shallow outwardly facing recess, a maze of randomly arranged filaments mounted in said recess effective to receive and releasably interengage with a multiplicity of flexible hooks adapted to be fixed to and extend outwardly from the surface of a film leader thereby to hold a leader releasably assembled to said takeup reel.

12. A takeup reel as defined in claim 11 characterized in that said recess encircles said hub adjacent the outboard of a film reader takeup arbor, and the outer surface of said maze of filaments being located radially inwardly of the outer surface of said hub.

13. That improvement in a microfilm reader of the type having a film image projecting station located between first and second reel supporting arbors having reversibly rotatable inboard ends and reel receiving outboard ends, said improvement comprising a film takeup reel fixed to said first arbor by means thwarting the unauthorized removal thereof, and means on said takeup reel for releasably securing the end of a film leader thereto from a supply reel mountable over the outboard end of said second arbor.

14. That improvement defined in claim 13 characterized in said film leading securing means includes a first component carried by the hub of said takeup reel and a cooperating second component separably engageable with said first component and adapted to be carried by the leader of a film coiled on a supply reel mountable on said second arbor.

15. That improvement defined in claim 13 characterized in that said takeup reel includes radial flange means on the outboard end of the reel hub which is deeply notched to facilitate attachment of a film leader to the hub of said takeup reel, and the hub of said takeup reel having a radial slot to receive and grip the end of a film leader while being wound about said hub.

16. That improvement defined in claim 13 characterized in that said film leader securing means includes first and second interengageable components, said first component being secured to the surface of a film leader normally facing toward the hub of said takeup reel while attached thereto, and said first and second components being constructed and operable to hold said film leader releasably secured to the hub of said takeup reel while being wound thereon.

17. That improvement defined in claim 16 characterized in that said first and second components are offset laterally from the longitudinal center line of a film leader.

18. That improvement defined in claim 16 characterized in that said second interengageable component attached to said film leader includes a camming surface remote from the transverse free end edge of a film leader and positioned to engage the rim of a pair of circular transparent flats between which the film images pass at said image projection station, and the engagement of said camming surface of said second component with the circular rim of one of said transparent flats as the film leader is being rewound onto a film supply reel being effective to cast said leader laterally outwardly sufficiently to release said leader from between said flats.

19. That improvement defined in claim 14 characterized in that said means securing said takeup reel to said first arbor is carried by a portion of the reel hub normally covered by film so long as any film remains coiled about the hub of said takeup reel.

20. That improvement defined in claim 14 characterized in that said takeup reel securing means is positioned beneath said first component of said film leader securing means.

21. That improvement defined in claim 14 characterized in that second leader securing component is secured to the surface of a film leader in an area spaced backwardly from the free end of the leader thereby permitting said film leader to be selectively anchored to the slotted hub of a conventional film takeup reel and to a takeup reel equipped with said first leader securing component at the user's option.

22. A converter kit adapted for installation on microfilm reader equipment of the type having reversible first and second reel supporting arbors on the opposite sides of a film image projection station and effective to safeguard against removal of film from the reader while wound on a takeup reel, said converter kit comprising: a film takeup reel having fastener means operable to anchor said reel firmly to a film reader takeup arbor, said fastener means being rendered inoperable while film remains coiled on said takeup reel, first and second separably interengageable components to hold a film leader secured to said takeup reel, one of said components comprising a maze of randomly arranged filaments interconnected to one another at points of crossover and the other of said components comprising a maze of flexible barbs releasably engageable with the filaments of said one component, said first component being fixed to the hub of said reel and said second component being bondable to the surface of a film leader in an area radially opposite said first component as said leader is brought in contact with the hub of said takeup reel.

23. A converter kit adapted for installation on microfilm reader equipment of the type having reversible first and second reel supporting arbors on the opposite sides of a film image projection station and effective to safeguard against removal of film from the reader while wound on a takeup reel, said converter kit comprising: film takeup reel means, means for anchoring said reel to a film reader takeup arbor and positioned to be rendered inoperative to release said reel from a takeup arbor while film remains coiled on said takeup reel, and means on said takeup reel releasably securing a film leader to said takeup reel so long as said reel is rotating in a direction to coil film thereon and operable to release a film leader as said reel is rotated in a direction to uncoil film and the film leader therefrom.

24. That improvement in a microfilm reader of the type having a film projecting station operatively associated with respect to first and second film reel supporting reversibly rotatable arbors each having an inboard end and an unobstructed outboard end, the outboard end of said first arbor being adapted to have a film supply reel telescoped thereover, and said second arbor having means fixed thereto for use in succession to reel and store film from any one of an indefinite number of different supply reels while a film-bearing supply reel is supported on said first arbor whereby film temporarily reeled on said second arbor must be restored to the supply reel for detachment from said microfilm reader.

25. That method of safeguarding against the removal of microfilm from a microfilm reader while reversely reeled on a film reel which method comprises: providing a film reader of the type having a supply reel arbor and a takeup reel arbor with means fixed to the takeup arbor for coiling film thereabout as film is uncoiled from a supply reel temporarily supported on said supply arbor thereby to thwart attempts of the user to remove the coiled from the microfilm reader while wound about the takeup arbor.

26. That method defined in claim 25 characterized in the step of providing said takeup arbor means and a microfilm leader each with separate coupling means constructed and arranged to anchor the film leader to said takeup arbor means as the film leader advances thereover while said takeup arbor means is rotating in one direction and to release the film leader therefrom as said takeup arbor means is rotating in the reverse direction.

* * * * *